United States Patent
Hamdi et al.

(10) Patent No.: US 9,727,110 B2
(45) Date of Patent: Aug. 8, 2017

(54) OPTIMIZED POWER OVER ETHERNET POWER DISTRIBUTION SYSTEM

(71) Applicant: Dell Products L.P., Round Rock, TX (US)

(72) Inventors: Rabah S. Hamdi, Spring, TX (US); Srinivasa Rao Nagalla, Austin, TX (US); Benny Thottakkara, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 274 days.

(21) Appl. No.: 13/776,420

(22) Filed: Feb. 25, 2013

(65) Prior Publication Data

US 2014/0245031 A1    Aug. 28, 2014

(51) Int. Cl.
*G06F 1/00* (2006.01)
*G06F 1/28* (2006.01)
*G06F 1/32* (2006.01)
*G06F 1/26* (2006.01)

(52) U.S. Cl.
CPC ............... *G06F 1/28* (2013.01); *G06F 1/26* (2013.01); *G06F 1/266* (2013.01); *G06F 1/3203* (2013.01); *G06F 1/3209* (2013.01)

(58) Field of Classification Search
CPC ......... G06F 1/3203; G06F 1/26; G06F 1/3209
See application file for complete search history.

(56) References Cited

U.S. PATENT DOCUMENTS

| | | | | |
|---|---|---|---|---|
| 7,221,261 | B1* | 5/2007 | Klingensmith | H04L 12/10 340/12.32 |
| 7,240,224 | B1* | 7/2007 | Biederman | 713/300 |
| 2004/0230846 | A1* | 11/2004 | Mancey | H04L 12/10 713/300 |
| 2006/0133368 | A1* | 6/2006 | Tolliver | 370/389 |
| 2006/0224754 | A1* | 10/2006 | Jain | H04L 12/46 709/230 |
| 2008/0005600 | A1 | 1/2008 | Diab et al. | |
| 2008/0052546 | A1* | 2/2008 | Schindler et al. | 713/300 |
| 2008/0114997 | A1 | 5/2008 | Chin | |
| 2008/0162973 | A1* | 7/2008 | Landry | H04L 12/10 713/340 |
| 2008/0244282 | A1* | 10/2008 | Hansalia et al. | 713/300 |
| 2008/0256598 | A1* | 10/2008 | Diab | G06F 1/266 726/2 |

(Continued)

*Primary Examiner* — Mohammed Rehman
*Assistant Examiner* — Gayathri Sampath
(74) *Attorney, Agent, or Firm* — Haynes and Boone, LLP (57) ABSTRACT

A power distribution system includes a manager provided on a network controller and an agent provided on a line module. The manager is operable to receive a configuration for a port on the line module. A connection to the port is then detected by the agent and communicated to the manager. At least one of the manager and the agent determines that the connection is for a powered device that is operable to receive power and data through the port. The manager then classifies the powered device. If the manager determines that the classification of the powered device corresponds to the configuration of the port, the manager provides power to the powered device through the port according to an allocation for the powered device from a global power budget.

20 Claims, 5 Drawing Sheets

(56) References Cited

U.S. PATENT DOCUMENTS

| | | | |
|---|---|---|---|
| 2010/0007334 A1* | 1/2010 | Apfel | H04L 12/10 |
| | | | 324/123 R |
| 2011/0320833 A1 | 12/2011 | R. et al. | |
| 2012/0228936 A1* | 9/2012 | Kabbara | G06F 1/266 |
| | | | 307/29 |
| 2013/0103958 A1* | 4/2013 | Hua | H04L 12/10 |
| | | | 713/310 |

* cited by examiner

OPTIMIZED POWER OVER ETHERNET POWER DISTRIBUTION SYSTEM

CROSS REFERENCE TO RELATED APPLICATIONS

The present application is related to U.S. Utility application Ser. No. 13/671,135, filed on Nov. 7, 2012; U.S. Utility application Ser. No. 13/738,364, filed on Jan. 10, 2013; and U.S. Utility application Ser. No. 13/776,466, filed on Feb. 25, 2013, the disclosures of which are assigned to the assignee of record in the present application and incorporated herein by reference in their entirety.

BACKGROUND

The present disclosure relates generally to information handling systems, and more particularly to an information handling system that optimizes power distribution to powered devices using Power over Ethernet technology.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some IHSs use Power over Ethernet (PoE) technology to send power and data to other IHSs and/or receive power and data from other IHSs. PoE technology provides for the transmission of power, along with the data, safely over Ethernet cabling. The original Institute of Electrical and Electronics Engineers (IEEE) 802.3af standards provide up to 15.4 watts (W) of DC power (minimum 44 volts (V) direct current (DC) and 350 milliamps (mA)), while the updated IEEE 802.3at standards (also known as PoE+) provides up to 25.5 W. The IEEE 802.3af and IEEE 802.3at standards provide for the classification of powered devices (PDs) based on a predefined control protocol or hardware classification, and the power sourcing equipment (PSE) device statically assigns the power level of the power that will be provided to the PD based on the amount designated in the standards for the PD's classification. There are currently 5 classifications: Class 0, the default classification, provides for devices that draw a current of 0-4 mA and a power range of 0.44-12.94 W. Class 1 provides for devices that draw a current of 9-12 mA and a power range of 0.44-3.84 W. Class 2 provides for devices that draw a current of 17-20 mA and a power range of 3.84-6.49 W. Class 3 provides for devices that draw a current of 26-30 mA and a power range of 6.49-12.95 W. Class 4, used by 802.3at devices, provides for devices that draw a current of 36-44 mA and a power range of 12.95-25.5 W.

The static assignment by the PSE device of the power level that will be provided to a PD based on the classification discussed above raises a number of issues. Such static assignments result in the PSE device statically allocating the maximum amount of power needed by a PD of that class when operating (e.g., a PD classified as a class 3 device results in the PSE statically allocating 12.95 W to that PD even if that PD actually draws a maximum of only 8 W power.) Thus, current PoE power systems are inefficient in their allocation of power due to their static assignment of power to PDs based on a classification that can result in the PSE assigning more power to a PD than is necessary.

Accordingly, it would be desirable to provide an improved PoE power distribution system.

SUMMARY

According to one embodiment, a power distribution system includes a manager provided on a network controller; and an agent provided on a line module, wherein at least one of the manager and the agent are operable to: receive a configuration for a port on the line module; detect a connection to the port; determine that the connection is for a powered device that is operable to receive power and data through the port; classify the powered device; and determine that the classification of the powered device corresponds to the configuration of the port and, in response, power the powered device through the port according to an allocation for the powered device from a global power budget.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
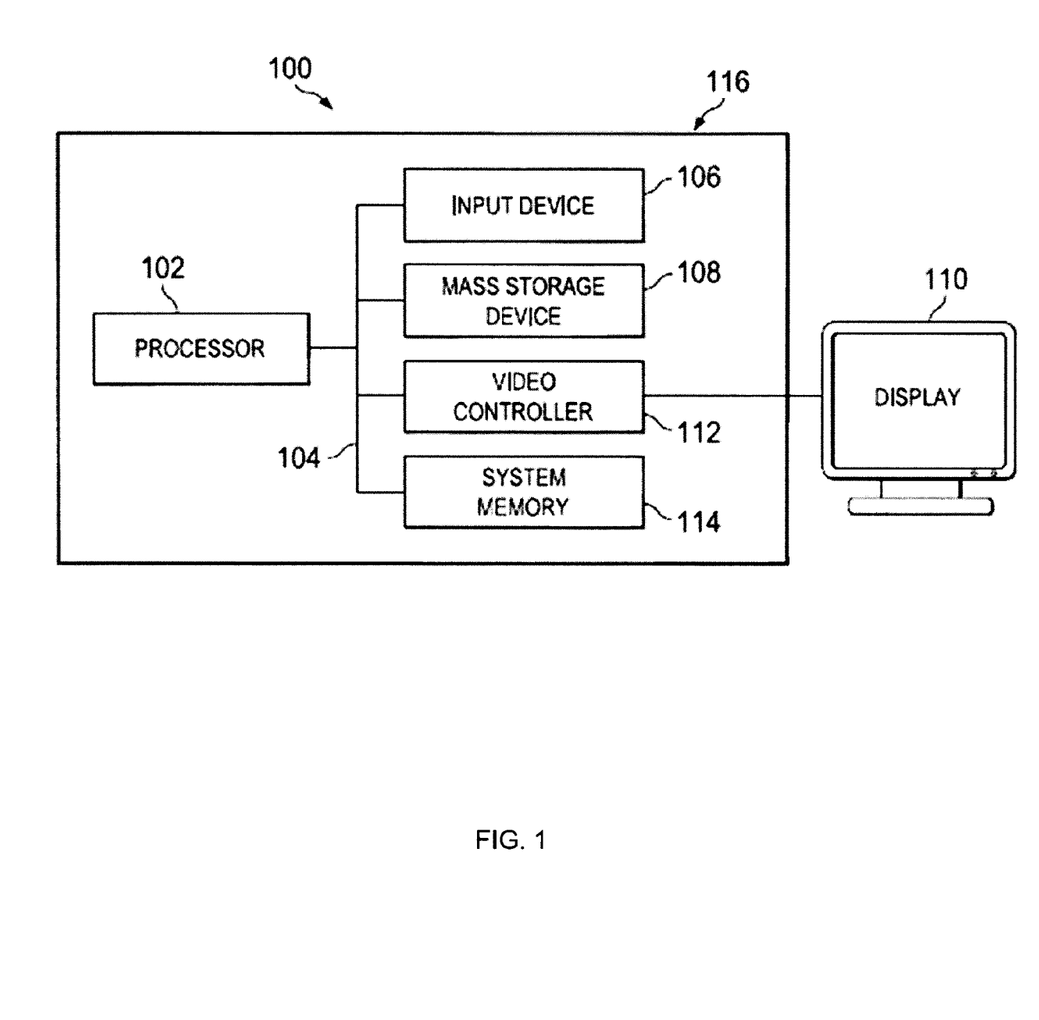
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
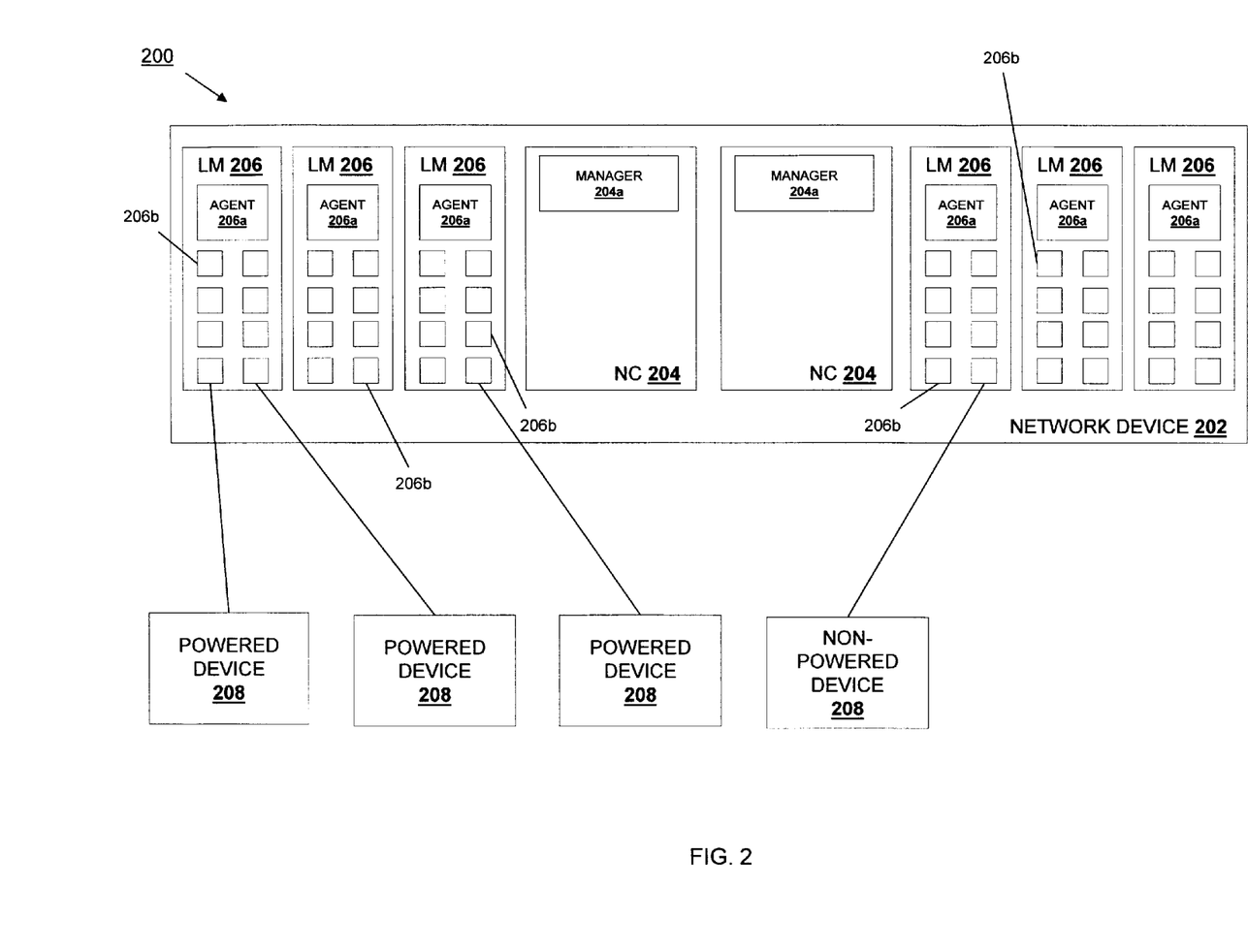
FIG. 2 is a schematic view illustrating an embodiment of a network device.

Referring now to FIG. 2, an embodiment of a networked system 200 is illustrated. The networked system 200 includes a network device 202 that may be the IHS 100 discussed above with reference to FIG. 1 or may be some of the components of the IHS 100. In an embodiment, the network device 202 may include a switch, a network interface card, a routing module, a wireless network module, and/or a variety of other network device known in the art. The network device 202 of the illustrated embodiment includes a pair of Network Controllers 204 and a plurality of line modules 206 that are each coupled together using methods known in the art. For example, a centralized switching application specific integrated circuit (ASIC) may be implemented on a network controller 204 and communicatively connected to each of the line modules 206. Each network controller 204 and line module 206 may include a processor system and memory system. In the illustrated embodiment, each network controller 204 includes instructions on its memory system that, when executed by its processing system, cause the processing system to provide a manager 204a that is operable to perform the functions discussed below. In the illustrated embodiment, each line module 206 includes instructions on its memory system that, when executed by its processing system, cause the processing system to provide an agent 206a that is operable to perform the functions discussed below.

The line modules 206 each include a plurality of ports 206b that may or may not be operable to provide Power over Ethernet (PoE), which is a technology that allows the network device 202 to pass electrical power, along with data, safely over Ethernet cabling to PoE capable connected devices. Thus, some or all of the line modules 206 may be PoE capable and some of the line modules 206 may not be PoE capable. Furthermore, devices may be connected to any of the ports 206b on the line modules 206 that may or may not be PoE capable (i.e., operable to receive electrical power, along with data, safely over Ethernet cabling). In the illustrated embodiment, powered devices 208 are coupled to ports 206b on different line modules 206, while a non-powered device 210 is coupled to a port 206b on a line module 206. In an embodiment, the powered devices 208 may include information handling systems such as, for example, Internet telephones, routers, personal computers, servers, port extenders, and/or a variety of other IHS powered devices known in the art.

In the illustrated embodiment, managers 204a have been illustrated as provided on each network controller 204, and agents 206a have been illustrated as provided on each line module 206. However, the number and locations of managers 204a and agents 206a in the networked system 200 may vary greatly while still being operable to provide the functionality discussed below. For example, a single manager 204a may be provided on one of the network controllers 204 (e.g., with no manager 204a provided on the other network controller 204.) In another example, manager(s) and agent(s) may each be provided on the network controller(s) 204 or the line module(s). In other words, a manager or managers and an agent or agents may be provided in different physical locations in the networked system 200 other than those illustrated while still allowing for the functionality discussed below. In some embodiments, agents may be provided on powered devices 208 that include ports that may be coupled to other powered devices such as, for example, port extenders.

Figure 3:
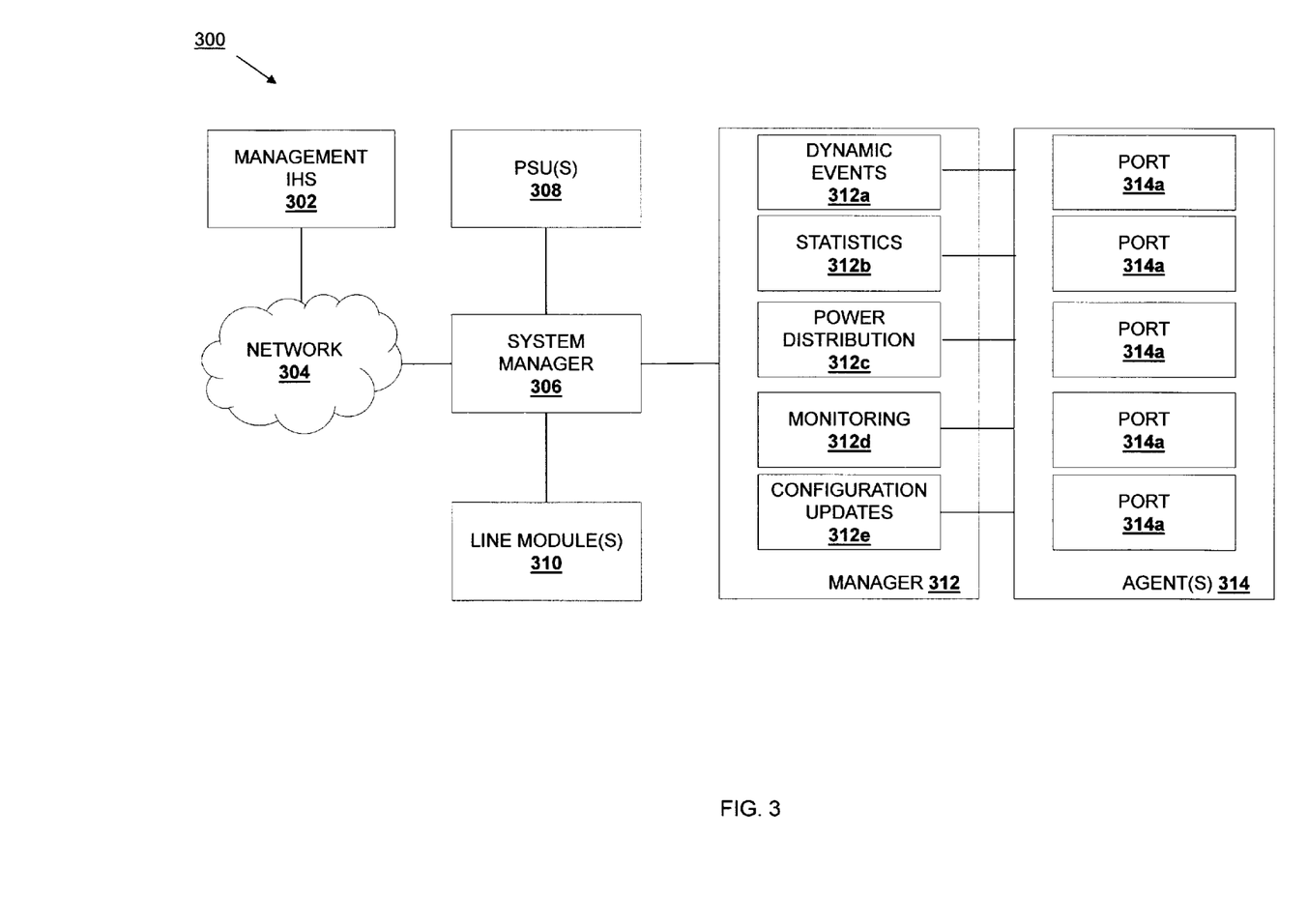
FIG. 3 is a schematic view illustrating an embodiment of a power management architecture in the network device of FIG. 2.

Referring now to FIG. 3, an embodiment of an optimized PoE power distribution system 300 is illustrated that includes some of the elements of the networked system 200 discussed above with reference to FIG. 2. While some of the elements of the networked system 200 of FIG. 2 are not illustrated in the optimized PoE power distribution system 300, those elements may be present (e.g., as discussed above in the networked system 200) but have been omitted for clarity of discussion. The optimized PoE power distribution system 300 includes a management IHS 302 connected to a network 304. In an embodiment, the management IHS 302 may include, for example, a web-based systems management graphical user interface (GUI) or simple network management protocol (SNMP), and/or a variety of other management IHSs known in the art. A system manager 306 that oversees the management of the system and provides the necessary interfaces to system hardware is coupled to the network 304, one or more Power Supply Units (PSUs) 308, one or more line modules 310, and a manager 312 that may be either or both of the managers 204a on the network controllers 204 in the network device 200 of FIG. 2. The manager 312 is operable to perform functions such as, for example, detecting of dynamic events 312a, recording of statistics 312b, distribution of power 312c, monitoring 312d, configuration updates 312e, and/or a variety of other PoE management functions discussed herein. The manager 312 is coupled to one or more agents 314 that monitor a plurality of ports 314a on the one or more line modules 310 (or one or more connected powered devices 208). While the one or more agents 314 are illustrated in the optimized PoE power allocation system 300 as separate from the one or more line modules 310, as discussed above, agents 206b may be provided on the line module 206 as illustrated in FIG. 2.

Figure 4:
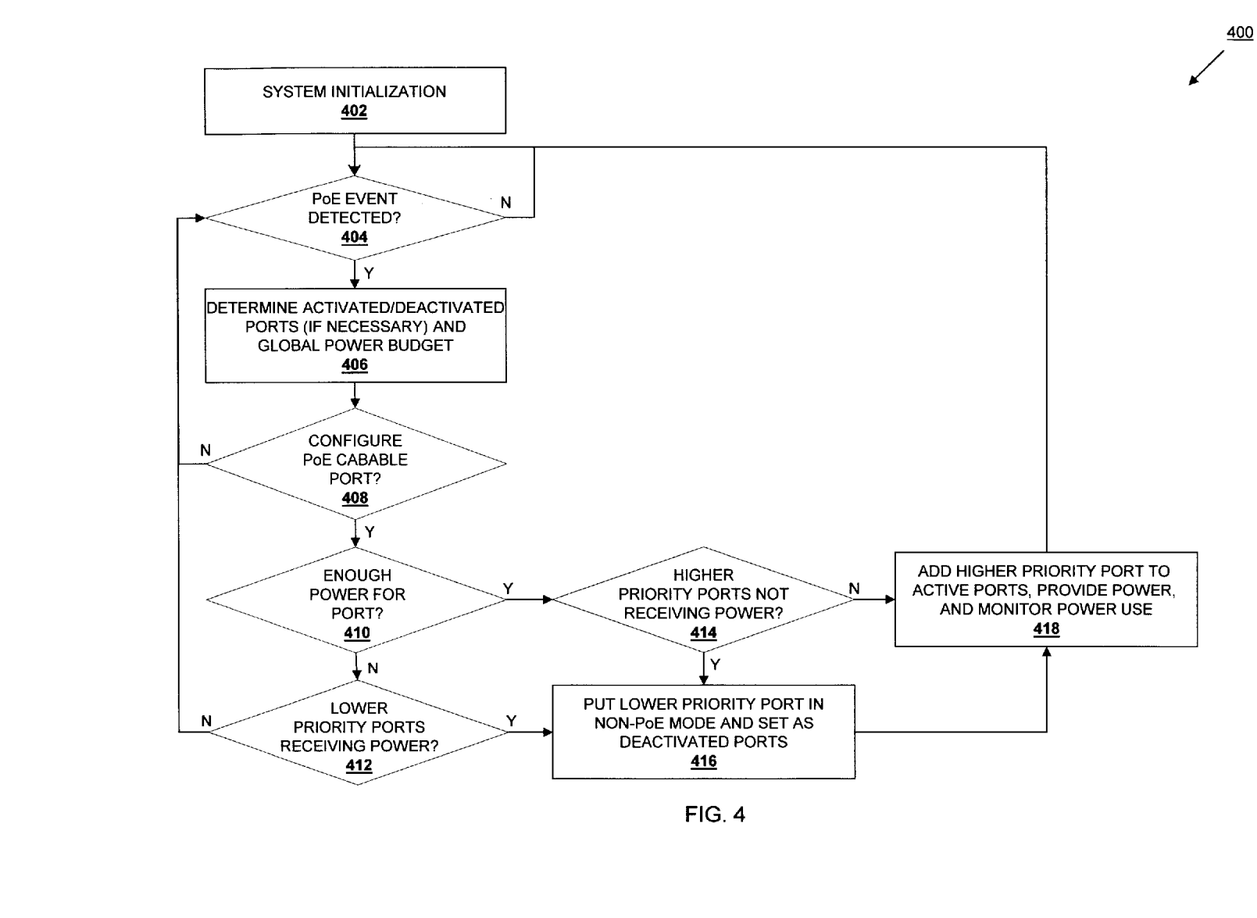
FIG. 4 is a flow chart illustrating an embodiment of a power distribution method.

Referring now to FIG. 4, an embodiment of a power over Ethernet (PoE) distribution method 400 is illustrated. The method 400 begins at block 402 where a PoE system is initialized. In an embodiment, the network device 202, discussed above with reference to FIG. 2 is initialized. For example, the network device 202 may be plugged in to a power source, powered on, reset, and/or otherwise initialized using methods known in the art. In an embodiment, when system initialization is complete at block 402, the method 400 proceeds to decision block 404 where it is determined whether a PoE event is detected. In an embodiment, a PoE event may include, for example, a PSU 308 failure, the connection of a PSU 308 to the network device 202, the connection of a powered device 208 to the network device 202, the disconnection of a powered device 208 from the network device 202, a line module 206 failure, the connection of a line module 206 to the network device 202, a power state change of a powered device 208, a Command Line Interface (CLI) configuration change in the network device 202, a Link Layer Discovery Protocol change, a powered device 208 attempting to consume more power than its classification, the failure of a powered device 208, and/or a variety of other PoE events known in the art. The detection of the PoE event at decision block 404 may be performed by the manager(s) 204a and/or the agent(s) 206b. For example, an agent 206b (on a line module 206 or the network controller 204) may detect the connection of a powered device 208 to a port 206b and communicate that to the manager 204a, an agent 206b (on a line module 206 or the network controller 204) may detect the connection of a line module 206 to the network device 202 and communicate that to the manager 204a, a manager 204a may detect a change in the power supplied to the network device 202, a manager 204a may detect a disconnection of a line module 206 to the network device 202, etc. If no PoE event is detected at decision block 404, the method 400 loops back through decision block 404 until a PoE event is detected.

While the embodiment of block 404 described above involves a manager 204a on a network device 202 detecting an PoE event occurring on a port 206bg of a line module 206 on that same network device 202, other embodiments of the present disclosure may extend the detection of PoE events to ports on a powered device 208 such as, for example, a port extender. Thus, the manager 204a may communicate with an agent or agents on the line modules 206 and/or the port extender to detect PoE events occurring on the port extender. Furthermore, actions discussed below as being performed on ports 206b of the network device 202 may be carried out on ports of a port extender while remaining within the scope of the present disclosure.

When a PoE event is detected at decision block 404, the method 400 proceeds to block 406 where activated and deactivated ports are determined (if necessary) and a global power budget is determined. In an embodiment, the manager 204a may track the activated and deactivated ports on the network device 202 using an activated and deactivated port list that is stored in the memory system on the network controller 204. For example, PoE capable ports 206b on the line modules 206 that are connected to powered devices 208 may be tracked in the activated and deactivated port list as activated ports, PoE capable ports 206b on the line modules 206 that are enabled to provide power over Ethernet cabling but that are not connected to a powered device 208 may be tracked in the activated and deactivated port list as activated ports, PoE capable ports 206b on the line modules 206 that are connected to non-powered devices 210 may be tracked in the activated and deactivated port list as deactivated ports, PoE capable ports 206b on the line modules 206 that are disabled from providing power over Ethernet cabling may be tracked in the activated and deactivated port list as deactivated ports, etc. At block 406, a PoE event (e.g., the connection/disconnection of a powered device 208 to a port 206b, a reconfiguration instruction for a port 206b, the connection/disconnection of a line module 206, etc.) may result in the manager 204a determining which of the ports 206b on the network device 202 are activated and deactivated and updating, re-computing, or otherwise re-determining the activated and deactivated port list. However, if there is no change in the activated and deactivated ports on the network device 202, the activated and deactivated port list may not be changed. In some embodiments, a power delivery status for ports on the network device 202 that are being tracked as deactivated ports may be set to "OFF" such that power is not supplied to a deactivated port.

Furthermore, at block 406, a global power budget is determined. As discussed above, a network device (e.g., the network device 202) includes a plurality of ports (e.g., the ports 206b) that are operable to connect to and provide data and power to powered devices 208 safely over Ethernet cabling, as well as connect to and provide data to non-powered device (i.e., devices that receive data through the ports but receive power through a separate connection to a power source.) In an embodiment, a manager 204a in a network controller 204 communicates with agents 206a on the line modules 206 to determine the power requirements of a plurality of PoE powered device 208 connected to PoE ports 206b on the line modules 206 (discussed in further detail below). For example, the manager 204a may communicate with the agents 206a to compile the activated and deactivated port list, discussed above, and use PoE classification techniques to determine the power requirements of each powered device 208 connected to an activated PoE port 206b. The manager 204a in the network controller 204 also determines a total power supplied from one or more PSUs (e.g., the one or more PSUs 308 discussed with reference to FIG. 3). The manager 204a may then determine a global power budget by allocating power from the total power supplied from the PSU(s) 308 to each of the connected powered devices 208 according to their power requirements (discussed in further detail below). Thus, at block 402 a global power budget is determined that allocates power available to the network device 200 to a plurality of powered devices 208 connected to and powered via the ports 206b on the line modules 206. In an embodiment, the global power budget information may be stored in the memory system coupled to the manager 204a. In an embodiment, allocation of power from the global powered budget to connected powered devices 208 may be based upon profiles for the ports, priorities of the ports, powered device classifications, and/or configurations provided by a user, as well as power consumption of the powered devices. While block 402 is illustrated as occurring once in the method 400, the global power budget may be re-determined periodically in response to, for example, the connection of powered devices, the disconnection of powered devices, a change in the power available to the network device 202, and/or due to a variety of other scenarios known in the art, as discussed below. Furthermore, the determination of the global power budget may be extended to powered devices 208 such as, for example, port extenders that include a plurality of PoE capable ports that have powered devices connected to them.

The method 400 then proceeds to decision block 408 where it is determined whether a PoE capable port should be configured. If at decision block 408, it is determined that a PoE capable port should not be configured, the method 400 returns to decision block 404 to determine whether a PoE event has been detected, discussed above. If it is determined that a PoE capable port should be configured, the manager 204a and/or the agent 206a located on or coupled to the line card 206 that includes that port may then configure the port. In an embodiment, active PoE ports may have already been configured prior to the method 400, and such PoE ports may not be determined to need configuration at decision block 408. For example, some active PoE ports may have been configured prior to the detection of the PoE event at decision block 404, and thus at decision block 408, those PoE ports will not be determined to need configuration. In other embodiments, PoE ports may not have been configured prior to the detection of the PoE event at decision block 404, or the PoE event may result in PoE ports that need to be configured or reconfigured, and at decision block 408 it will be determined that those PoE ports need configuration. In response to determining that a PoE port needs configuration, the manager 204a and/or the agent 206a operate to configure that PoE port. In an embodiment, the configuration of a PoE port may include allowable device classification types, setting power limits, dynamic power allocations, and/or a variety of other PoE port configuration actions know in the art.

The method 400 then proceeds to decision block 410 where it is determined whether there is enough power for the port configured at decision block 408. As discussed above, the manager 204a determines a global power budget that may be stored in the memory system coupled to the manager 204a. In response to configuring a PoE capable port, the manager 204a determines at decision block 410 whether the global power budget includes enough power (e.g., the total power supplied to the network device 202 by the PSU(s) 308) to power that PoE port in light of the current power allocations to each of the PoE ports that were receiving power prior to the detection of the PoE event at decision block 404. For example, prior to the detection of the PoE event, the manager 204a may have allocated all of the total power supplied to the network device 202 to the PoE ports already connected to powered devices 208, and thus at decision block 410, the manager 204a may determine that there is not enough power for the port 206b that was configured at decision block 408. In another example, there may be a surplus of power being supplied to the network device 202 that is not allocated or provided to any PoE ports connected to powered devices 208, and thus at decision block 410, the manager 204a may determine that there is enough power for the port 206b that was configured at decision block 408.

If, at decision block 410, it is determined that there is not enough power for the port 260b that was configured at decision block 408, the method 400 proceeds to decision block 412 where it is determined whether there are lower priority ports receiving power. In an embodiment, at decision block 412, the manager 204a may retrieve (e.g., by communicating with one or more agents 206a on the line modules 206) the priorities of ports 206b on those line modules 206, and then compare the retrieved priorities of the ports allocated power from the global power budget to the priority of the port 206b that was configured at decision block 408. If the manager 204a determines that there are no PoE ports 206b on the network device 202 that are receiving power and that have a lower priority than the port 206b configured at decision block 408, the method 400 returns to decision block 404 to determine whether a PoE event has been detected, discussed above (i.e., the port 206b configured at decision block 408 may not be allocated or provided power). If the manager 204a determines that there are PoE ports 206b on the network device 202 that are receiving power and that have a lower priority than the port 206b configured at decision block 408, the method 400 proceeds to block 416, discussed in further detail below.

If, at decision block 410, it is determined that there is enough power for the port that was configured at decision block 408, the method 400 proceeds to decision block 414 where it is determined whether there are higher priority ports that are not receiving power. In an embodiment, at decision block 412, the manager 204a may retrieve (e.g., by communicating with one or more agents 206a on the line modules 206) the priorities of ports 206b on those line modules 206, and then compare the retrieved priorities of the ports allocated power from the global power budget to the priority of the port that was configured at decision block 408. If the manager 204a determines that there are no PoE ports 206b on the network device 202 that are not receiving power and that have a higher priority than the port 206b configured at decision block 408, the method 400 proceeds to block 416, discussed in further detail below.

If, at decision block 414, the manager 204a determines that there are PoE ports 206b on the network device 202 that are not receiving power and that have a higher priority than the port configured at decision block 408, or if, at decision block 412, the manager 204a determines that there are PoE ports 206b on the network device 202 that are receiving power and that have a lower priority than the port configured at decision block 408, the method 400 proceeds to block 416 where lower priority ports are put in a non-PoE mode and set as deactivated ports. For example, the manager 204a may determine at decision block 412 that there are PoE ports 206b on the network device 202 that are receiving power and that have a lower priority than the port configured at decision block 408 and, in response, send an instruction to the agent 206a on the line card 206 (that includes the lower priority port) to put the lower priority port into a non-PoE mode such that power is not allocated from the global power budget for, or supplied to, that lower priority port. In addition, the manager 204a may set the lower priority port as a deactivated port in the activated and deactivated port list. In another example, the manager 204a may determine at decision block 414 that there are PoE ports 206b on the network device 202 that are not receiving power and that have a higher priority than the port 206b configured at decision block 408 and, in response, send to the agent 206a (e.g., on the line card 206 that includes the port configured at decision block 408) an instruction to put the port configured at decision block 408 into a non-PoE mode such that power is not allocated from the global power budget for, or supplied to, the port configured at decision block 408. In addition, the manager 204a may set the port configured at decision block 408 as a deactivated port in the activated and deactivated port list.

Following block 416, or if it is determined at decision block 414 that there is no port that is not receiving power and that has a higher priority than the port 206b configured at decision block 408, the method 400 proceeds to block 418 where the higher priority port is added to the active ports, provided power, and has its power use monitored. For example, at block 416, the manager 204a may have put a lower priority port (than the port that was configured at decision block 408) that was receiving power, as determined in decision block 412, into a non-PoE mode while setting that lower priority port as deactivated, and at block 418, the manager 204a will add the port that was configured at decision block 408 as an activated port in the activated and deactivated port list, provide power to that port, and monitor the power use of that port. In another example, at block 416, the manager 204a may have put the port that was configured at decision block 408 into a non-PoE mode and set that port as deactivated, and at block 418, the manager will add the higher priority port (than the port that was configured at decision block 408) that was not receiving power, as determined in decision block 414, as an activated port in the activated and deactivated port list, provide power to that port, and monitor the power use of that port. In another example, the manager 204*a* may have determined at decision block 414 that there were no ports that were not receiving power that also had a higher priority than the port configured at decision block 408 and, at block 418, the manager 204*a* will add the port that was configured at decision block 408 as an activated port in the activated and deactivated port list, provide power to that port, and monitor the power use of that port.

Figure 5:
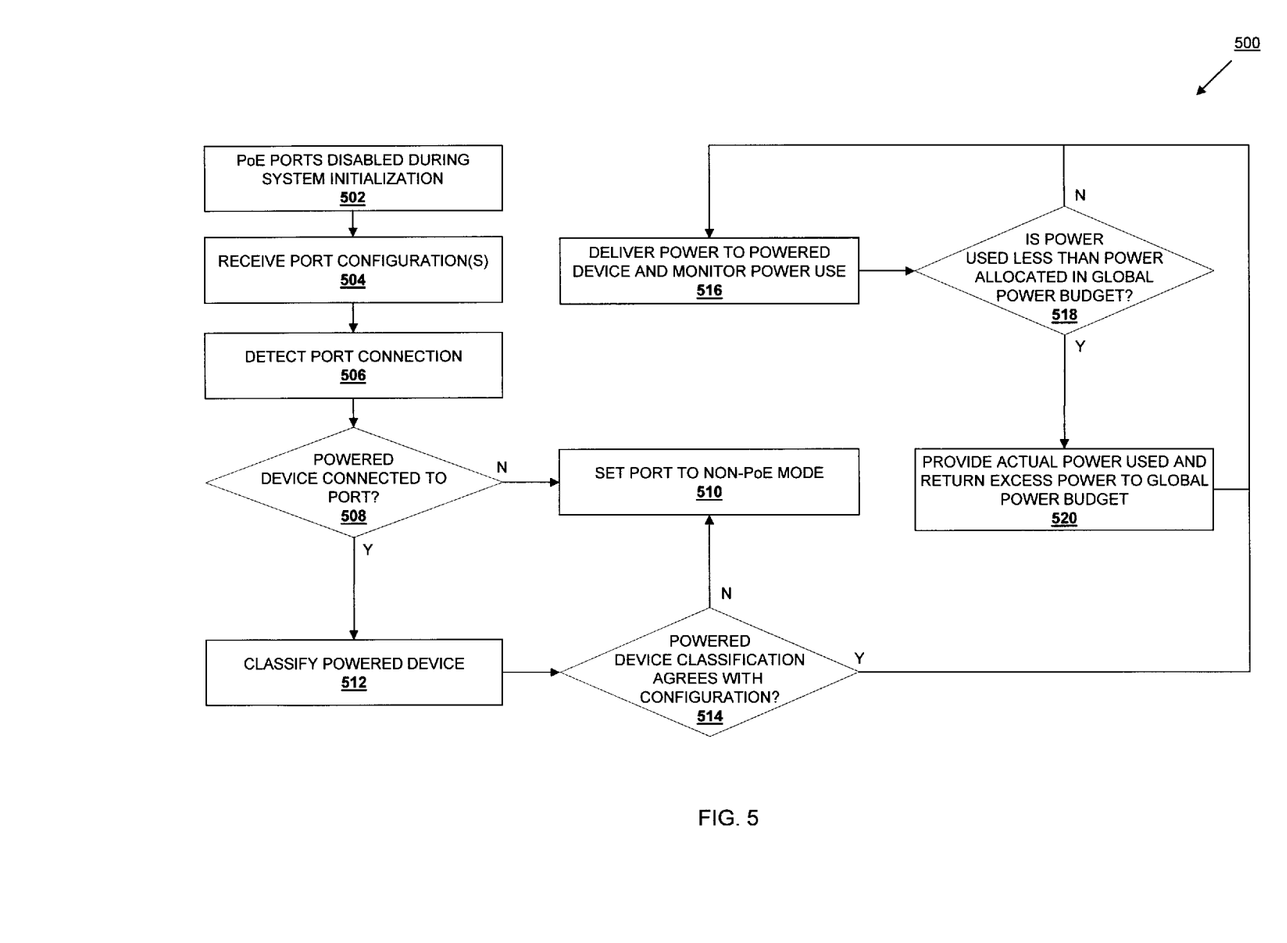
FIG. 5 is a flow chart illustrating an embodiment of a power distribution method

Referring now to FIG. 5, an embodiment of a power over Ethernet (PoE) distribution method 500 is illustrated. In some embodiments, the method 500 may be performed concurrently with the method 400, discussed above with reference to FIG. 4. The method 500 begins at block 502 where PoE ports are disabled during system initialization. As discuss above, in an embodiment, the network device 202 discussed above with reference to FIG. 2 may be initialized. For example, the network device 202 may be plugged in to a power source, powered on, reset, and/or otherwise begin initialization using methods known in the art. During initialization, the manager 204*a* may poll the agents 206*b* on the line modules to determine a plurality of the ports 206*a* on the line modules 206 that are PoE capable ports. In an embodiment of block 502, the manager 204*a* may then disable all PoE capable ports during initialization such that, for example, none of the total power supplied by the PSU(s) 308 to the network device 202 is initially supplied to the any of the PoE ports. In this manner, the manager 204*a* on the network device 202 may ensure that power from the global power budget is not wasted by allocating that power to PoE ports contrary to a configuration desired by a user of the network device 202. In another embodiment, only some or none of the PoE capable ports on the line modules 206 of the network device 202 are disabled.

The method 500 then proceeds to block 504 where port configuration(s) are received. In an embodiment, a user of the network device 202 may provide one or more port configurations for the ports 206*b* on the network device 202. For example, a user may provide configurations for the PoE capable ports 206*b* on the line modules 206 in the network device 202 that include port priorities, power allocations for ports, allowable port classifications, dynamic power allocation capabilities, and/or a variety of other PoE capable port configurations known in the art. In an embodiment, the manager 204*a* receives the configurations provided by the user at block 504 and stores those configurations in the memory structure. Thus, at block 504, the manager 204*a* may receive configurations for any or all of the PoE capable ports on the network device 202 and store them in a memory, database, or other storage structure. In some embodiments, configurations may be provided using a cloud based system such as, for example, via the management IHS 302 (running cloud-based management software) through the network 304. For example, the management IHS 302 may provide a graphical user interface (GUI) that displays on a display device of the management IHS 302 graphical representations of the network device 202, each port 206*b*, powered device 208 coupled to those ports 206*b*, other powered device coupled to ports on the powered devices 208 (e.g., in a situation where a port extender is provided as a powered device 208), and/or a variety of other elements of the PoE power distribution system. Such a GUI on the management IHS 302 may allow a user to select and configure specific ports 206*b* coupled to specific powered device 208. Furthermore, such a GUI may be able provide a variety of the information that is used by the system as discussed herein, including but not limited to a graphical representation of activated PoE ports, deactivated PoE ports, events occurring on PoE ports, power state and consumption of powered devices, powered device types, statistics of ports including power information, and/or a variety of other information associated with the system. While block 504 is illustrated as occurring subsequent to block 502, the systems 200 and/or 300 may receive configurations for ports at any time including prior to the initialization at block 502.

The method 500 then proceeds to block 506 where a port connection is detected. In an embodiment, at block 506, an agent 206*a* on a line module 206 may detect the connection of a device (e.g., an IHS) to one of the ports 206*b* on that line module 206 through an Ethernet cable. In response to detecting that connection, the agent 206*a* may send a signal to the manager 204*a* on the network controller 204 such that the manager 204*a* detects the connection to the port. While in the embodiment of the method 500 discussed herein, the connection of a single device to a port 206*b* on the network device 202 is provided, one of skill in the art will recognize that the method 500 (and particularly block 506 and subsequent blocks) may be performed for any number of devices that are connected to ports 206*b* on the network device 202. Furthermore, the detection o the connection to a port may include the detection of the connection to a port on a powered device such as, for example, a port extender.

The method 500 then proceeds to decision block 508 where it is determined whether a powered device was connected to the port in block 506. In an embodiment, a powered device 208 connected to a port 206*b* on the network device 202 may include a resistor and/or classification current that indicates to the agent 206*a* or manager 204*a* that that device is a PoE capable powered device, while non-powered devices will not include such a resistor and/or classification current. However, in other embodiments, the determination of whether the device connected to the port 206*b* in block 506 is a powered device may be made by using a variety of other powered device determination methods know in the art If at decision block 508, it is determined that the device connected to the port 206*b* at block 506 is not a powered device 208, the method 500 proceeds to block 510 where that port is set to a non-PoE mode. For example, the manager 204*a* may determine, or the agent 206*a* may determine and communicate that determination to the manager 204*a*, that the device connected to the port at block 506 is a non-powered device 210 and, in response, the manager 204*a* and/or agent 206*a* may set that port 206*b* to a non-PoE mode such that power from the global power budget is not allocated to the port 206*b* and power from the total power supplied by the PSU(s) 308 to the network device 202 is not supplied to the port 206*b*. Furthermore, in some embodiments of block 510, power may be removed from entire line modules 206 using a single command (e.g., if each of the ports 206*b* on that line module 206 do not have a powered device 208 connected to them or are lower priority ports for which there is not sufficient power.) If at decision block 508, it is determined that the device connected to the port 206*b* at block 506 is a powered device 208, the method 500 proceeds to block 512 where the powered device is classified. For example, the manager 204*a* may determine, or the agent 206*a* may determine and communicate that determination to the manager 204*a*, that the device connected to the port at block 506 is a powered device 210 and, in response, the manager 204*a* and/or agent 206*a* may use a resistance and/or classification current detected with the connection of the powered device 208 to the port 206*b* to classify the powered device. In an embodiment, a classification current 9-12 mA may provide for a class 1 powered device that conventionally receives a static power of 3.84 W, a classification current of 17-20 mA may provide for a class 2 powered device that conventionally receives a static power of 6.49 W, a classification current of 26-30 mA may provide for a class 3 powered device that conventionally receives a static power of 12.95 W, and a classification current of 36-44 mA may provide for a class 4 powered device that conventionally receives a static power of 25.5 W.

The method 500 then proceeds to decision block 514 where it is determined whether the classification of the powered device from block 512 agrees with the configuration of the port provided by the user in block 504. In an embodiment, the manager 204a and/or the agent 206a compares the powered device classification determined at block 512 with the configuration provided by the user at block 504 for the port 206b to which the connection of the powered device 208 was detected at block 506. If the classification of the powered device 208 does not agree with the user configuration for the port 206b to which it was connected, the method 500 proceeds to block 510 where that port is set to a non-PoE mode substantially as described above. For example, a port 206b may be configured by a user for a powered device that may not exceed 12 watts of power, and a powered device 208 that is classified for more than 12 watts may be connected to that port 206b, and in response, the manager 204a and/or agent 206a will set that port 206b to a non-PoE mode.

If, at decision block 514, the classification of the powered device 208 agrees with the user configuration for the port 206b to which it was connected, the method 500 proceeds to block 516 where power is delivered to the powered device and the power use of the powered device is monitored. For example, a port 206b may be configured by a user for providing no more than 22 watts of power, and a powered device 208 that is classified for lower than 22 watts may be connected to that port 206b, and in response, the manager 204a and/or agent 206a will allocate power from the global power budget to the powered device 208 and supply power through the port 206b to the powered device 208 from the total powered supplied by the PSU(s) 308 to the network device 202. In an embodiment, the manager 204a may allow power from the global power budget to the powered device 208 according to the configuration of the powered device 208 provided at block 504, and provide that allocated power from the total powered supplied by the PSU(s) 308 to the network device 202 to the powered device 208 through the port 206b The manager 204a and/or agent 206a may then operate to monitor the power consumption or use of the powered device 208 through the port 206b using, for example, a hardware current detect that is coupled to the port 206b.

The method 500 then proceeds to decision block 518 where it is determined whether the power used by the powered device is less than the power allocated from the global power budget to that powered device. In an embodiment, the manager 204a compares the power use of the powered device 208 monitored at block 518 to the power allocated from the global power budget to the powered device 208 at block 516, and determines whether that monitored power use is less than the allocated power. If, at decision block 518, the manager 204a determines that the monitored power use of the powered device 208 is not less than (or not less than by at least a predetermined amount) the power allocated to that powered device 208 from the global power budget, the method 500 returns to block 516 where the manager 204a and/or agent 206a operate to deliver power to the powered device 208 through the port 206b according to the configuration of the powered device 208 while monitoring the power use by the powered device 208.

If, at decision block 518, the manager 204a determines that the monitored power use of the powered device 208 is less than (or less than by at least a predetermined amount) the power allocated to that powered device 208 from the global power budget, the method 500 proceeds to block 520 where the manager 204a and/or the agent 206a operate to allocate the actual power being used by the powered device 208 (e.g., as monitored at block 516) to the powered device 208 from the global power budget and supply that allocated power to the powered device 208 through the port 206b, while returning the excess, unused power (i.e., the power allocated to the powered device 208 but not being used) to the global power budget. In response to the provision of the actual power used to each powered device 208 and the return of excess power allocations to the global power budget, disabled or deactivated PoE capable ports on the network device 202 may be activated or enabled. The method 500 then returns to block 516, in which the system operates substantially as discussed above, but with the exception that the powered delivered to the powered device 208 through the port 206b is the actual power being used by the powered device 208 rather than the power allocated according to the configuration received at block 24.

Therefore, the method 500 allows a user to configure the ports on a network device, and following the connection of devices to any of those ports, that connected device may be determined to be a powered device (or the port set to non-PoE mode), classified, and delivered power according to the configuration of the powered device if that classification agrees with the users configuration. Then the power consumption of the powered device is monitored and the power allocated to that powered device adjusted if the powered device is consuming less power than is allocated to it.

Thus, systems and methods have been described that optimize the distribution of power available by a network device to a plurality of a powered devices using PoE technology. This optimization is performed by disabling PoE ports that do not have powered devices connected to them, enabling those PoE ports once a powered device is connected, allowing a user to configure PoE ports for particular powered devices, monitoring the power consumption of powered devices that are allocated power from a global power budget and adjusting the power allocated to those powered devices based on their actual power consumption, prioritizing ports and allocating power based on those priorities, and/or using a variety of other techniques described herein. Such optimizations provide for the powering of a maximum number of powered device in limited power supply situations, along with the efficient use of power by those powered devices.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A power distribution system, comprising: a manager provided on a network controller; and
   an agent provided on a line module, wherein at least one of the manager and the agent are configured to:

receive a configuration for a port on the line module;
  detect a connection to the port when the port has been continuously disabled from providing power in response to a system initialization and
  determine, while the port is continuously disabled from providing power subsequent to the system initialization, that the connection is for a powered device that is configured to receive power and data through the port;
  classify, while the port is continuously disabled from providing power subsequent to the system initialization, the powered device; and
  determine, while the port is continuously disabled from providing power subsequent to the system Initialization, whether the classification of the powered device corresponds to the configuration of the port;
  wherein, in response to the classification of the powered device corresponding to the configuration of the port, the port is enabled to provide power for a first time subsequent to the system initialization and power is provided to the powered device through the port according to an allocation for the powered device from a global power budget; and
  wherein, in response to the classification of the powered device not corresponding to the configuration of the port, the port remains disabled from providing power subsequent to the system Initialization.

2. The system of claim 1, wherein at least one of the manager and the agent are configured to:
  monitor a dynamic power use by the powered device.

3. The system of claim 2, wherein the monitoring includes determining that the power used by the powered device is lower than the allocation for the powered device from the global power budget, and wherein at least one of the manager and the agent are configured to:
  power the powered device through the port according to the dynamic power use of the powered device and return unused power to the global power budget.

4. The system of claim 1, wherein at least one of the manager and the agent are configured to:
  determine the global power budget.

5. The system of claim 1, wherein at least one of the manager and the agent are configured to:
  determine that the port is activated and, in response, add the port to an activated port list; and
  determine that the port is deactivated and, in response, add the port to a deactivated port list.

6. The system of claim 1, wherein at least one of the manager and the agent are configured to:
  determine there is not enough power in the global power budget to power the powered device through the port; and
  determine that there is a lower priority port on the line module through which power is being provided from the global power budget and, in response, cease providing power through the lower priority port and power the powered device through the port.

7. The system of claim 1, wherein at least one of the manager and the agent are configured to:
  determine there is enough power in the global power budget to power the powered device through the port; and
  determine that there is a higher priority port on the line module though which power is not being provided from the global power budget and, in response, cease providing power to the powered device through the port and provide power through the higher priority port.

8. An information handling system (IHS), comprising:
  at least one line module including a plurality of ports that are each configured to provide power and data to a powered device;
  at least one processing system coupled to the at least one line module; and at least one memory system coupled to the processing system and including instructions that, when executed by the processing system, cause the processing system to provide a manager and an agent, wherein at least one of the manager and the agent are configured to:
  receive a configuration for each of the plurality of ports on the at least one line module;
  detect a connection to a first port and a second port of the plurality of ports when the first port and the second port are continuously disabled from providing power in response to a system initialization and subsequent to the system initialization:
  determine, while the first port is continuously disabled from providing power subsequent to the system initialization, that the connection to the first port is for a first powered device that is configured to receive power and data through the first port;
  determine, while the second port is continuously disabled from providing power subsequent to the system initialization, that the connection to the second port is for a second powered device that is configured to receive power and data through the second port;
  classify, while the first port and the second port are continuously disabled from providing power subsequent to the system initialization, the first powered device and the second powered device; and
  determine, while the first port and the second port are continuously disabled from providing power subsequent to the system Initialization, whether the classification of the first powered device corresponds to the configuration for the first port and whether the classification of the second powered device corresponds to the configuration for the second port;
  wherein, in response to the classification of the first powered device corresponding to the configuration for the first port, the first port is enabled to provide power for a first time subsequent to the system Initialization and power is provided to the first powered device through the first port according to an allocation for the first powered device from a global power budget;
  wherein, in response to the classification of the second powered device corresponding to the configuration for the second port, the second port is enabled to provide power for a first time subsequent to the system initialization and power is provided to the second powered device through the second port according to an allocation for the second powered device from the global power budget;
  wherein, in response to the classification of the first powered device not corresponding to the configuration for the first port, the first port remains disabled from providing power subsequent to the system initialization; and
  wherein, in response to the classification of the second powered device not corresponding to the configuration for the second port, the second port remains disabled from providing power subsequent to the system initialization.

9. The IHS of claim 8, wherein at least one of the manager and the agent are configured to:
  monitor a dynamic power use by the first powered device and the second powered device.

10. The IHS of claim 9, wherein the monitoring includes determining that the power used by the first powered device is lower than the allocation for the first powered device from the global power budget, and wherein at least one of the manager and the agent are configured to:
  power the first powered device through the first port according to the dynamic power use of the first powered device and return unused power to the global power budget.

11. The IHS of claim 8, wherein at least one of the manager and the agent are configured to:
  determine the global power budget.

12. The IHS of claim 8, wherein at least one of the manager and the agent are configured to:
  determine that the first port and the second port are activated and, in response, add the first port and the second port to an activated port list; and
  determine that the first port and the second port are deactivated and, in response, add the first port and the second port to a deactivated port list.

13. The IHS of claim 8, wherein at least one of the manager and the agent are configured to:
  determine there is not enough power in the global power budget to power the first powered device through the first port; and
  determine that the second port is a lower priority port than the first port through which power is being provided from the global power budget to the second powered device and, in response, cease providing power through the second port to the second powered device and power the first powered device through the first port.

14. The IHS of claim 8, wherein at least one of the manager and the agent are configured to:
  determine there is enough power in the global power budget to power the first powered device through the first port; and
  determine that the second port is a higher priority port through which power is not being provided to the second powered device from the global power budget and, in response, cease providing power to the first powered device through the first port and provide power through the second port to the second powered device.

15. A power distribution method, comprising:
  receiving a configuration for a port on a line module;
  detecting a connection to the port when the port has been continuously disabled from providing power in response to a system initialization and subsequent to the system initialization;
  determining, while the port is continuously disabled subsequent to the system initialization, that the connection is for a powered device that is configured to receive power and data through the port;
  classifying, while the port is continuously disabled from providing power subsequent to the system Initialization, the powered device; and
  determining, while the port is continuously disabled from providing power subsequent to the system initialization, whether the classification of the powered device corresponds to the configuration of the port;
  wherein, in response to the classification of the powered device corresponding to the configuration of the port, the port is enabled to provide power for a first time subsequent to the system initialization and power is provided to the powered device through the port according to an allocation for the powered device from a global power budget; and
  wherein, in response to the classification of the powered device not corresponding to the configuration of the port, the port remains disabled from providing power subsequent to the system initialization.

16. The method of claim 15, further comprising:
  monitoring a dynamic power use by the powered device.

17. The method of claim 16, wherein the monitoring includes determining that the power used by the powered device is lower than the allocation for the powered device from the global power budget, and the method further comprises:
  powering the powered device through the port according to the dynamic power use of the powered device and returning unused power to the global power budget.

18. The method of claim 15, further comprising:
  determining the global power budget.

19. The method of claim 15, further comprising:
  determining that the port is activated and, in response, adding the port to an activated port list; and
  determining that the port is deactivated and, in response, adding the port to a deactivated port list.

20. The method of claim 15, further comprising:
  determining whether there is enough power in the global power budget to power the powered device through the port; and
  in response to determining that there is not enough power in the global power budget to power the powered device through the port, ceasing providing power through a lower priority port on the line module and powering the powered device through the port in response to determining that the lower priority port is being provided power from the global power budget; and
  in response to determining that there is enough power in the global power budget to power the powered device through the port, ceasing providing power to the powered device through the port and providing power through a higher priority port on the line module in response to determining that the higher priority port is not being provided power from the global power budget.

* * * * *

UNITED STATES PATENT AND TRADEMARK OFFICE
CERTIFICATE OF CORRECTION

PATENT NO. : 9,727,110 B2
APPLICATION NO. : 13/776420
DATED : August 8, 2017
INVENTOR(S) : Rabah S. Hamdi, Srinivasa Rao Nagalla and Benny Thottakkara Page 1 of 1

It is certified that error appears in the above-identified patent and that said Letters Patent is hereby corrected as shown below:

In the Claims

In Column 13, Line 4: insert -- subsequent to the system initialization -- after the word "and";
In Column 13, Line 13: "Initialization" should read -- initialization --;
In Column 13, Line 27: "Initialization" should read -- initialization --;
In Column 14, Line 18: replace ":" with -- ; --;
In Column 14, Line 34: "Initialization" should read -- initialization --;
In Column 14, Line 42: "Initialization" should read -- initialization --;
In Column 15, Line 20: insert -- from providing power -- after "disabled";
In Column 15, Line 55: "Initialization" should read -- initialization --.

Signed and Sealed this
Thirteenth Day of March, 2018

Andrei Iancu
*Director of the United States Patent and Trademark Office*